Patented June 17, 1930

1,764,792

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

INSECTICIDE AND FUNGICIDE COMPOUND

No Drawing.   Application filed September 1, 1925. Serial No. 53,946.

My invention relates to compositions useful as insecticides and fungicides and is based upon my discovery that the liquid condensed products resulting from the partial oxidation of hydrocarbons possess valuable characteristics for such purposes. Such products contain bodies of different molecular weights in the range from alcohols through alcohol aldehydes and aldehydes, to and including oxygenated acids of the aldehydic hydroxy or lactonic type.

These products are preferably obtained by the processes set forth in several of my copending applications, such as Serial No. 435,355, filed January 16, 1921 for partial combustion methods for treating aliphatic hydrocarbons. That application discloses the main preferred process in which hydrocarbons, preferably of the aliphatic or aliphatic and naphthenic types and usually consisting of mineral oil or a fraction thereof, are vaporized by application of heat and subjected while in vapor phase and mixed with regulated proportions of oxygen preferably in the form of air, to partial oxidation, preferably in the presence of catalytic material such as the oxides or compounds of molybdenum or vanadium, or oxides or compounds of the high melting point electro-negative low atomic volume metals. The temperature of the heated reaction zone, wherein the vapor-oxygen mixture is preferably brought into contact with the catalyst, is maintained below a red heat and below the temperature at which continuous self sustained combustion would occur. The exit stream is condensed preferably by passing through a condenser, and then through scrubbers where direct contact with a liquid such as water is secured. The air proportion is varied according to the catalyst used, the temperature, and the speed of the current. The amount of air is preferably below the theoretical amount for the production of these partial oxidation products; and the more active the catalyst the nearer the air can approach the theoretical amount. Steam or other diluent may also be supplied in regulated proportions.

The apparatus may consist of any desirable type of vaporizing apparatus such as a coil of pipe or a retort, externally heated by any desired heating means, the air being supplied after vaporization so that the vapor-oxygen mixture passes over, through or in contact with the catalytic material which may be in the form of a perforate screen in a conduit leading from the mixing chamber. After contact with the catalyst the gaseous mixture is led to a condenser, and thence preferably to a direct-contact scrubber or scrubbers. The hydrocarbons used are preferably, from petroleum, or the oily products from the low temperature distillation of bituminous coal, or shale oil. This application also discloses the condensation of the complex partly oxidized products, and the treatment of such products by distillation, saponification, chemical treatment, alcoholic extraction, etc. The liquid product mixture usually contains alcohols of different molecular weights, aldehyde-like bodies of different molecular weights, inner and outer ethers, esters of the inner or lactone type, acid anhydrides, oxygenated organic acids of different molecular weights, these compounds being of both the saturated and unsaturated types, and some cyclated bodies. The product varies somewhat according to the variation of factors in the process, and the fraction of raw material used.

For insecticide and fungicide use, a compound should be relatively insoluble or poorly soluble in water when applied, and should gradually yield a toxic material over a considerable period of time. It should also not be washed off at once by rain, and should not be too toxic to be tolerated by the host plant or animal. I have found that the partly oxidized petroleum products above referred to possess these capabilities as well as good adhesive and spreading qualities and ease of application as, for example, by spraying. They may also be made in any locality and are cheaply produced. When kerosene or gas oil fractions are used as the raw material, such fractions of the product obtained by distillation, for example, are used as are found most suitable and are preferably used in emulsified forms.

As an example of preparing such materials, gas oil was subjected to the vapor phase partial oxidation process. The condensed product was distilled and the fraction distilling above 250° C. was treated with a base to substantially neutralize the free acids. For this purpose a weak base, such as sodium silicate is preferable. The oil was then poured off from the base layer (silicate in this case) and heated with one pound of ordinary soap in four pounds of water. About eight pounds of the oxidized oil can be thus added. The mixture is preferably heated up to the boiling point of the water and well stirred during heating. This process gives a stock solution ready for emulsification in the field by simply pouring into water. The quantity of water will be determined by the dilution desired in the particular case, for example, one of stock solution to sixty of water, one to a hundred, etc. This dilution depends upon the concentration desired for the pest under attack, the resistance of the plant being treated, etc.

A still more toxic solution may be obtained by preparing a mixture of soluble sodium or potassium soaps from the oxygenated acids obtained by my main process of the catalytic partial oxidizing of liquid hydrocarbons. Such soaps may be directly made, or made by first making insoluble soaps, and then converting these into soluble soaps, and used as emulsifiers. The resin soaps from my resin acids may be used.

I may also prepare soaps from the sulphonation product of the partial oxidation mixture obtained by sulphonating the liquid product or a portion thereof and use these as emulsifiers instead of ordinary soap.

A fraction of the total oxidation product may be treated as above set forth; or certain parts of the main partial oxidation product may be employed; for example, the portions obtained by the alcohol extraction process disclosed in my copending cases Nos. 745,024 and 747,106. In such process some of the more highly oxidized compounds such as esters, aldehydes and ketones are dissolved out and removed by diluted alcohol as a solvent, using such different degrees of dilution as are desirable. In this way I can prepare an emulsion of a more highly concentrated toxic oil, for special purposes.

The steps of preparing the partial oxidation product or part of it, for emulsion, may be changed; the emulsion or diluted material may be prepared in other ways, and the compounds may be used on plants, trees, animals, etc.

I claim:

1. An insecticide and fungicide composition containing a material percentage of a partial oxidation product of mineral oil, said product comprising a mixture of aliphatic compounds having artificially-introduced chemically-combined oxygen and of different molecular weights.

2. An insecticide and fungicide composition containing a material percentage of a partial oxidation product of mineral oil, said product comprising a mixture of aliphatic compounds having artificially-introduced chemically-combined oxygen and of different molecular weights and substantially freed of free acids.

3. An emulsifiable liquid insecticide and fungicide composition containing a material percentage of a partial oxidation product of mineral oil, said product comprising a mixture of aliphatic compounds having artificially-introduced chemically-combined oxygen and of different molecular weights.

4. An insecticide and fungicide composition containing a material percentage of a partial oxidation product of mineral oil, said product comprising a mixture of aliphatic compounds having artificially-introduced chemically-combined oxygen of different degrees of oxidation and of different molecular weights.

5. An emulsifiable liquid insecticide and fungicide composition containing a material percentage of a partial oxidation product of mineral oil, said product comprising a mixture of aliphatic compounds having artificially-introduced chemically-combined oxygen and of different molecular weights and containing sulphonated bodies.

6. An insecticide and fungicide composition containing sulphonated derivatives of aliphatic hydrocarbons containing artificially-introduced chemically-combined oxygen.

In testimony whereof I have hereunto set my hand.

JOSEPH HIDY JAMES.